F. CORYELL.
AUTOMOBILE SIGN HOLDER.
APPLICATION FILED AUG. 17, 1910.
Reissued Sept. 19, 1911.
13,291.
Fig. 1.
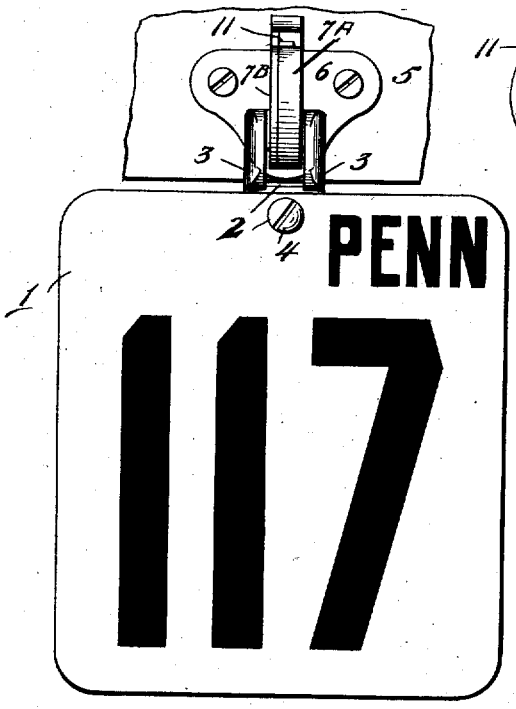
Fig. 2.
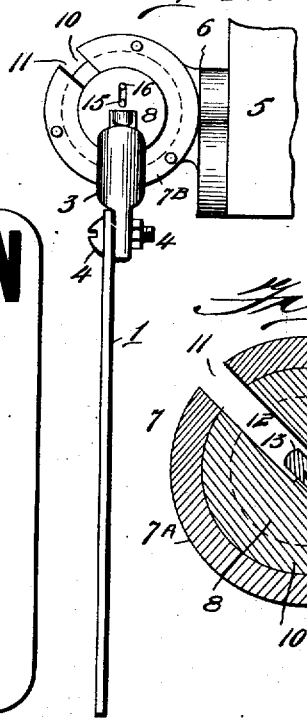
Fig. 3.
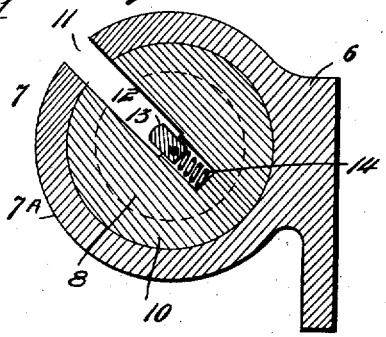
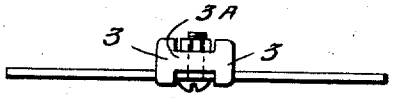
Fig. 5.
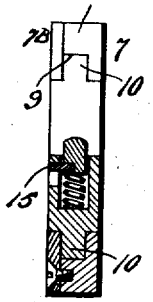
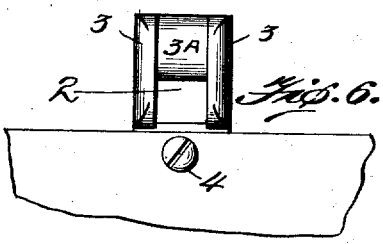
Fig. 6.
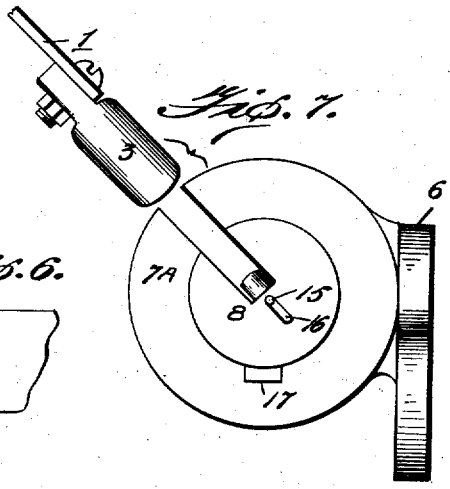
Fig. 7.
Fig. 4.
Witnesses
B. M. Offutt
H. R. Parsons
Inventor
Frank Coryell
by Wm. Moore
Attorney
COLUMBIA PLANOGRAPH CO., WASHINGTON, D. C.

UNITED STATES PATENT OFFICE.

FRANK CORYELL, OF TRENTON, NEW JERSEY, ASSIGNOR TO CORYELL AUTOMOBILE SIGN-HOLDER COMPANY, A CORPORATION OF NEW JERSEY.

AUTOMOBILE SIGN-HOLDER.

13,291. Specification of Reissued Letters Patent. Reissued Sept. 19, 1911.

Original No. 949,996, dated February 22, 1910, Serial No. 480,440. Application for reissue filed August 17, 1910. Serial No. 577,978.

*To all whom it may concern:*

Be it known that I, FRANK CORYELL, a citizen of the United States, and resident of Trenton, in the county of Mercer and State of New Jersey, United States of America, gentleman, have invented certain new and useful Improvements in Automobile Sign-Holders, of which the following is a specification.

My invention relates to improvements in sign holders for automobiles, and has special reference to a device of this character which may be readily applied to an automobile or other vehicle.

The object of the invention is the provision of an automobile sign holder which will lock a number plate securely in position but from which the sign may be readily detached and which will thus insure a great saving of time in changing one sign for another in passing the boundary line between two States.

The general nature of the invention is a sign holder which need not be strapped and unstrapped for the purpose of making the change, but consists of a holder to which the sign may be applied simply by taking one hand and placing the sign in a certain position in engagement with the holder and then turning the sign into desired position. To remove the sign only one hand is needed, for it is only necessary to turn the sign in the holder and pull it out of the same, occupying but a second of time.

Figure 1 represents an end elevation of the device showing a fragment of the automobile to which it is attached. Fig. 2 is a side elevation of what is exhibited in Fig. 1. Fig. 3 is a central section vertically through the lock. Fig. 4 is a section on the diameter of the lock. Fig. 5 is a plan view of the sign in condition for engagement with the holder. Fig. 6 is a front elevation of the device shown in Fig. 5, and, Fig. 7 shows the parts in position for engagement with each other.

In the drawings, in which similar characters of reference are employed to denote corresponding parts in the several views, the numeral 1 designates the sign, having the hole 2 at its upper portion, the hole being located, specifically stated, in an extension 3 of the sign, the extension 3 being secured to the sign by a screw 4.

The fragment of the vehicle is denoted by the character 5, while secured thereto is the bracket 6. To the bracket 6 is fastened a circular bearing 7 carrying the disk 8 which is free to rotate. The bearing is composed of two parts, $7^A$ and $7^B$. The part $7^B$ is a flat ring screwed to the part $7^A$, which latter is a ring also, having a circular recess shown in Figs. 2, 3 and 7. The disk 8 has a peripheral tongue 10 which fits into the recess at 9 and is held in place by the disk $7^B$, sufficiently loose to permit the rotation of the disk 8. There is a notch 11 forming an opening on one side of the rings $7^A$ and $7^B$, and there is a similar notch 12 extending from the edge to the center of the disk 8. The disk 8 may be rotated until the two notches 11 and 12 form one continuous notch, as illustrated in Fig. 3. This composite notch, formed of the notches 11 and 12, is just large enough to receive the extension 3, which is shown ready to be inserted, in Fig. 7.

At the bottom of the notch 12 is a button 13 located in a hole in the disk 8, and there is a spring 14 in said hole for extending the button 13 when it has been pushed into said hole. A pin 15 prevents the button from falling out. The pin is carried by the button 13 and extends through a slot 16 in the disk 8. The details of the extension are the two bars 3 connected by a cross piece $3^A$. The cross piece $3^A$ is just large enough to be pushed into the composite slot made up of the slots or notches 11 and 12, while the dimension of the cross piece in the direction of the diameter of the disk 8 is small enough to turn with said disk without hindrance by the rings $7^A$ and $7^B$.

The numeral 17 designates a notch on the inner periphery of the ring $7^A$ for receiving the cross piece $3^A$ while the sign is pointing downward. The button, by means of the spring 14 pushes the cross piece into the notch 17, and therefore the sign is locked in its normal position and can not be unlocked except by turning the sign upward so that the notches 11 and 12 register with each other.

The number 117 and the abbreviation "Penn" on the sign are representative of the number and name of a State as usually applied to automobile signs.

The operation of the device consists simply in pushing the cross piece $3^A$ into the notches 11 and 12 with considerable force so as to depress the button 13, and then the sign is rotated downward, whereby the cross piece turns the disk 8 while escaping any hindrance from the rings $7^A$ and $7^B$. When the sign reaches a downward vertical position, the button 13 automatically pushes the cross piece $3^A$ into the notch 17, whereby the sign becomes effectively locked to the automobile in its hanging condition; and yet the sign is easily removed by simply pressing the sign straight up against the force of the spring pressed button 13 until the cross piece is out of alinement with the periphery of the inner edge of the bearing and the bottom of the disk 8, when the sign may be turned upward until the notches 11 and 12 register with each other, when the sign may be pulled out and another inserted, as is the case on reaching the boundary between two States. To facilitate the operation of the holder, the cross piece should be slightly less in size than the depth of the notch 12 in the disk 8, while the hole 2 should be slightly larger than the radial thickness of the rings $7^A$ and $7^B$.

From the foregoing description taken in connection with the drawings it is evident that I provide a sign holder which can be instantly changed to exhibit the desired license number; also that the device can be applied to any desired part of the vehicle as circumstances require; also that the sign is held rigid and insures instant reading of the license number; also that one holder will be capable of carrying all the signs desired and that my device is inexpensive and durable, of ornamental and attractive appearance and entirely practical in every particular.

I claim:

1. The combination of a sign, bars extending therefrom, a cross piece connecting said bars, rings having a notch, a disk having a notch and rotary in said rings, a button in the bottom of the notch of said disk, a spring for said button, the two notches being adapted to register with each other when the disk is turned to a certain angle, and said cross piece being of a size to permit it to enter said notches, and to turn with said disk within said rings.

2. The combination of a sign, a bracket, a slotted bearing on said bracket, a slotted disk in said bearing, and rotary therein, a cross piece carried by said sign, the slots in said bearing and said disk registering with each other in a certain position of said disk, said slots being for receiving said cross piece, a resiliently acting button in the disk in the path of said cross piece, and said bearing having another slot for receiving said cross piece and locking the same from rotating by the action of the button pressing the cross piece in said slot while the said sign is hanging in its normal position, and a pin passing through a slot in the disk and fastened to said button, preventing the latter from falling away from the disk.

3. The combination of a bearing consisting of two rings, one of them having an annular recess, a disk located and rotary between said rings, an annular tongue on said disk and located in said recess, both of the rings and also the said disk having notches therein for registering with each other at a certain single position of said disk, a spring pressed button at the bottom of the notch which is in said disk, a sign, bars extending therefrom, a cross piece connecting said bars and fitting in the notch of said disk and inside of the bearing, said spring pressed button tending to push said cross piece from the notch in said disk, and another notch in said bearing for receiving said cross piece while the sign points downward.

4. A sign holder, comprising a broken ring having a notch formed interiorly therein, a slotted disk revolubly mounted in the ring, and a sign having a loop providing an eye in which the ring is engaged, the disk being adapted to carry the loop around into the notch in the ring.

5. A sign holder, comprising a ring having an opening therein having a notch formed in its inner periphery, a slotted disk revolubly mounted in the ring, a sign having a portion inserted through the opening in the ring into the slot, the revolution of the disk being adapted to bring the slot into alinement with the notch in the ring, and means mounted in the slot for forcing said portion of the sign into the said notch.

6. A sign holder, comprising a supporting bracket, a sign engaging disk rotatably mounted in the bracket, said bracket having a notch formed therein, a sign having a loop portion engaged by the disk, and means carried by the disk and engaging the loop to cause the same to move into the said notch in the bracket, the loop being of size to project from the notch into engagement with the disk to prevent unlocking rotation thereof.

7. A sign holder, consisting of a bracket having an opening therein, a disk mounted in the bracket and having an opening adapted to aline with the opening of the bracket, a sign having an extension having a hole and adapted to engage the alining openings and be turned to proper position and means for locking the sign in the proper position said means consisting of a spring pressed button seated and concealed in the disk and engaging a cross piece in the sign carrying extension.

Signed at Trenton, New Jersey, U. S. A., this 2nd day of August 1910.

FRANK CORYELL.

In presence of—

THEODORE BACKES,
HARRY S. PROVOST.

Copies of this patent may be obtained for five cents each, by addressing the "Commissioner of Patents, Washington, D. C."